(12) United States Patent
Nawata et al.

(10) Patent No.: US 6,176,543 B1
(45) Date of Patent: Jan. 23, 2001

(54) SEAT FOR VEHICLE (75) Inventors: Katsumi Nawata, Numazu; Makoto Sekizuka; Atsushi Hiroshige, both of Susono; Hiroshi Tamura; Hiroki Yamasaki, both of Toyota, all of (JP)

(73) Assignee: Toyota Jidosha Kabushiki Kaisha, Toyota (JP)

( * ) Notice: Under 35 U.S.C. 154(b), the term of this patent shall be extended for 0 days.

(21) Appl. No.: 09/169,950

(22) Filed: Oct. 13, 1998

(30) Foreign Application Priority Data

Oct. 13, 1997 (JP) .................................................... 9-278606

(51) Int. Cl.$^7$ ............................... B60N 2/02; B60N 2/42; B60N 2/427; B60N 2/50; B60R 21/02
(52) U.S. Cl. ........................... 296/189; 296/63; 296/68.1; 297/216.1
(58) Field of Search .................................. 296/189, 68.1, 296/63, 65.01, 188; 297/216.1

(56) References Cited

U.S. PATENT DOCUMENTS

| | | | |
|---|---|---|---|
| 3,762,764 | * 10/1973 | McJunkin | 296/63 |
| 3,973,799 | * 8/1976 | Berg | 296/65 |
| 5,370,440 | * 12/1994 | Rogala | 297/216.14 |
| 5,407,244 | * 4/1995 | Nakano et al. | 296/68.1 |
| 5,547,242 | * 8/1996 | Dukatz et al. | 296/65.1 |

FOREIGN PATENT DOCUMENTS

| 7-132767 | 5/1995 | (JP) . |
|---|---|---|
| 9-109755 | 4/1997 | (JP) . |

* cited by examiner

*Primary Examiner*—D. Glenn Dayoan
*Assistant Examiner*—Greg Blankenship
(74) *Attorney, Agent, or Firm*—Pillsbury Madison & Sutro LLP (57) ABSTRACT

A flange is formed at an upper edge of a lower arm, and the strength of an upper portion of the lower arm is set to be greater than the strength of a lower portion thereof. A fragile portion is formed in a longitudinally intermediate portion of the lower arm, and when an impact of a predetermined value or greater is applied in the rearward direction of the vehicle during a rear collision of the vehicle, the lower arm is adapted to absorb the impact by undergoing deformation beginning at the fragile portion. In addition, with respect to the load applied to the seat back from the rear by luggage or the like during a front collision of the vehicle, the deformation of the lower arm can be effectively suppressed by the flange.

23 Claims, 12 Drawing Sheets

PRIOR ART

FIG. 13

SEAT FOR VEHICLE

BACKGROUND OF THE INVENTION

1. Field of the Invention

The present invention relates to a seat for a vehicle, and more particularly to a seat for a vehicle for protecting a seated occupant of the vehicle from the impact occurring at the time of a rear collision of the vehicle.

2. Description of the Related Art

Conventionally, among seats for vehicles such as automobiles, there has been known a seat for a vehicle for protecting a seated occupant of the vehicle from an impact occurring at the time of a rear collision of the vehicle, and one example thereof is disclosed in Japanese Patent Application Laid-Open (JP-A) No. 7-132767.

Figure 13:
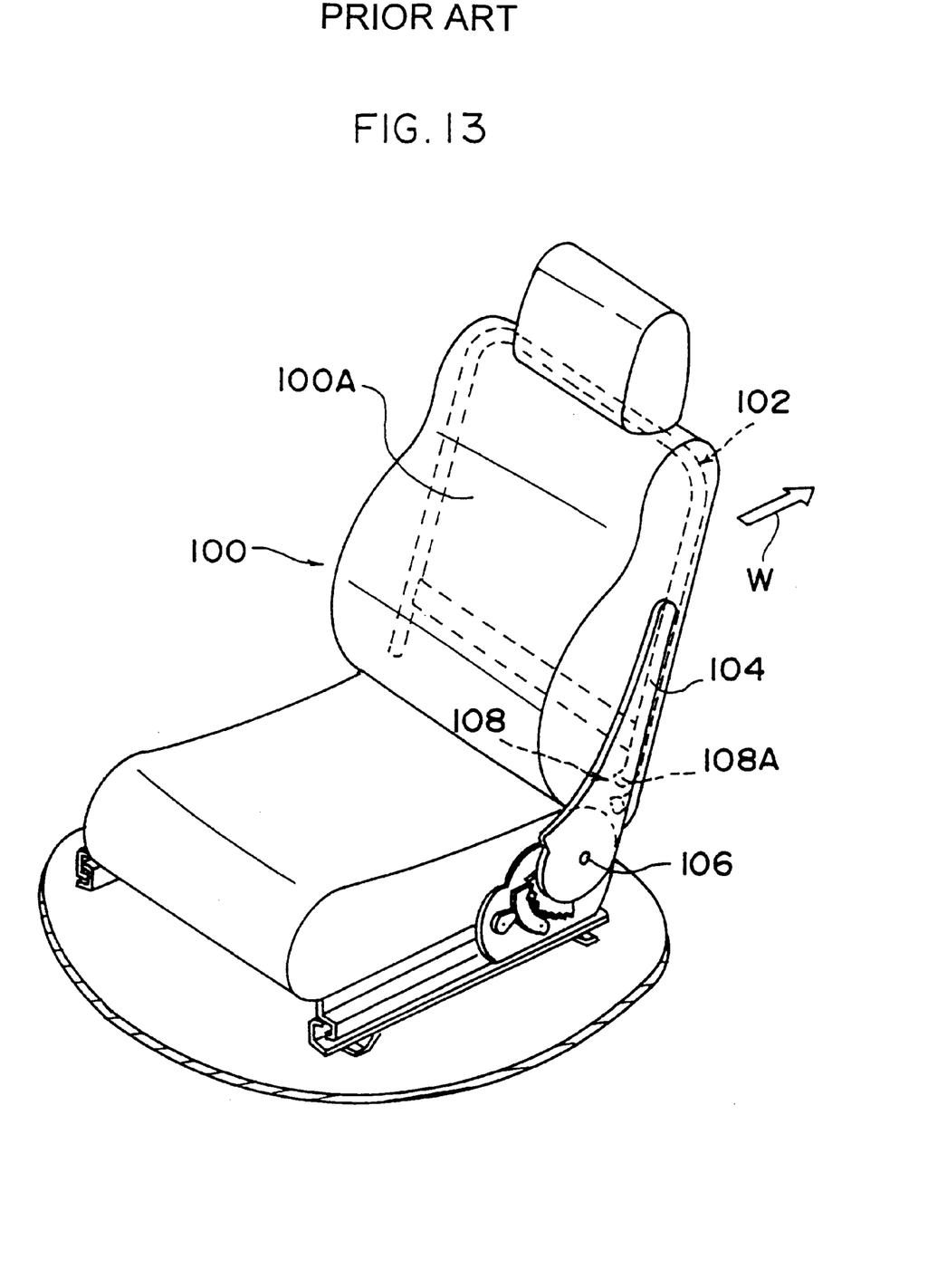
FIG. 13 is a perspective view illustrating a conventional seat for a vehicle.

As shown in FIG. 13, this seat 100 for a vehicle is arranged such that a strip-shaped wavelike reinforcing rib section 108 is formed at a lower end portion of a seat back frame 102 in such a manner as to extend along an inner surface of a supporting bracket 104 and zigzag toward a pivotally supporting portion 106 of the seat back frame 102 in an orthogonal direction to the axial direction of the pivotally supporting portion 106. Each bent portion of the reinforcing rib section 108 close to the supporting bracket 104 is attached to the inner surface of the supporting bracket 104. As a result, when the vehicle is hit by another vehicle or the like from the rear of the vehicle (namely, during a rear collision of the vehicle), and an impact is applied to the seat 100 in the direction going from the front of the vehicle towards the rear (in the direction of arrow W in FIG. 13), a zigzag portion 108A of the reinforcing rib section 108 undergoes contracting deformation by following the buckling deformation of the supporting bracket 104, so as to absorb the impact which cannot be borne by the rigidity of the reinforcing rib section 108.

However, with this seat 100 for a vehicle, if an impact of a predetermined value or greater is applied during the rear collision, the zigzag portion 108A of the reinforcing rib section 108 undergoes contracting deformation by following the buckling deformation of the supporting bracket 104, thereby inclining a seat back 100A backwardly.

SUMMARY OF THE INVENTION

In view of the above-described circumstances, it is an object of the present invention to provide a seat for a vehicle which is capable of absorbing the impact without the middle of the seat back itself bending during the rear collision of the vehicle.

To this end, in accordance with a first aspect of the present invention, there is provided a seat for a vehicle comprising: a side wall portion of a seat cushion frame for supporting a seat back, the side wall portion being deformable when a load applied to the seat back during a rear collision of the vehicle has reached a predetermined value or greater, so as to absorb an impact applied to a seated vehicle occupant.

Accordingly, when a vehicle is hit by another vehicle or the like from the rear, and the load applied to the seat back during a rear collision of the vehicle has reached a predetermined value or greater, a downward bending moment is applied by the seat back to the side wall portion of the seat cushion frame for supporting the seat back, so that a compressive force acting in the longitudinal direction of the vehicle is applied to a lower portion of the side wall portion. As a result, the lower portion of the side wall portion is deformed by that compressive force, thereby making it possible to absorb the impact. For this reason, it is possible to absorb the impact without buckling and deforming the seat back itself. In addition, the back of the occupant can be supported by the seat back while maintaining a seated position.

In accordance with a second aspect of the present invention, in the seat for a vehicle according to the first aspect of the invention, a fragile portion where the deformation begins to take place first is formed in the side wall portion of the seat cushion frame.

Accordingly, in addition to the arrangement provided for the seat for a vehicle according to the first aspect of the invention, when the load during the rear collision of the vehicle has reached a predetermined value or greater, the side wall portion of the seat cushion frame starts to deform beginning at the fragile portion, so that stable deformation is made possible by the fragile portion, and it is possible to reliably effect stable absorption of the impact.

In accordance with a third aspect of the present invention, in the seat for a vehicle according to the second aspect of the invention, the fragile portion is inclined at a predetermined angle with respect to the vertical direction of the side wall portion of the seat cushion frame, and has a step in the transverse direction of the vehicle.

Accordingly, in addition to the arrangement provided for the seat for a vehicle according to the second aspect of the invention, since the fragile portion has a step in the transverse direction of the vehicle in the side wall portion of the seat cushion frame, and is inclined at a predetermined angle with respect to the vertical direction, a large deformation area can be provided, so that the amount of absorption of the impact can be increased.

In accordance with a fourth aspect of the present invention, in the seat for a vehicle according to the first aspect of the invention, the side wall portion of the seat cushion is fixed to a vehicle body at two front and rear fixing portions, and undergoes deformation between the fixing portions.

Accordingly, in addition to the arrangement provided for the seat for a vehicle according to the first aspect of the invention, since the arrangement provided is such that when the load during the rear collision of the vehicle has reached a predetermined value or greater, the side wall portion of the seat cushion frame undergoes deformation at the two front and rear fixing portions, in a state where the compressive force in the longitudinal direction of the vehicle is not loaded onto the lower portion of the side wall portion between the two fixing portions, i.e., when there ceases to be any leeway in the compressive deformation of the side wall portion fixed at the two fixing portions, the compressive force in the longitudinal direction is no longer applied to the lower portion of the side wall portion, and the load is supported merely at the two fixing portions. Thus, it is possible to suppress the deformation of the side wall portion by a predetermined amount or more.

In accordance with a fifth aspect of the present invention, the seat for a vehicle according to the fourth aspect of the invention further comprises: a pair of front and rear links which are respectively disposed at the fixing portions to connect the vehicle body and the side wall portions of the seat cushion frame, wherein the front links have an extendable portion which extends in a direction in which a distance between link connecting points formed at opposite ends of the link is enlarged when the load applied to the seat back during the rear collision of the vehicle has reached the predetermined value or greater.

Accordingly, in addition to the arrangement provided for the seat for a vehicle according to the fourth aspect of the invention, when the load during the rear collision of the vehicle has reached a predetermined value or greater, the extendable portion formed in the front link is extended in the direction in which the distance between the link connecting points is enlarged, so that it is possible to increase the amount of absorption of the impact by virtue of the deformation of the side wall portion of the seat cushion frame, and the deformation can be stabilized further.

In accordance with a sixth aspect of the present invention, the seat for a vehicle according to any one of the first to fifth aspects of the invention further comprises: deformation-amount adjusting means for preventing the side wall portion of the seat cushion frame from becoming deformed by a predetermined value or greater.

Accordingly, in addition to the arrangement provided for the seat for a vehicle according to any one of the first to fifth aspects of the invention, since the side wall portion of the seat cushion frame is prevented from becoming deformed by a predetermined value or greater by the deformation-amount adjusting means, it is possible to reliably reduce the rearward inclination of the seat back.

In accordance with a seventh aspect of the present invention, the seat for a vehicle according to any one of the first to fifth aspects of the invention further comprises: deformed-state maintaining means for maintaining the deformed state when the amount of deformation of the side wall portion of the seat cushion frame has reached a predetermined value.

Accordingly, in addition to the arrangement provided for the seat for a vehicle according to any one of the first to fifth aspects of the invention, since the deformed state is maintained by the deformed-state maintaining means to suppress the return of the deformation when the amount of deformation of the side wall portion of the seat cushion frame has reached a predetermined value during the rear collision of the vehicle, the occupant can be held more effectively.

In accordance with an eighth aspect of the present invention, in the seat for a vehicle according to any one of the first to seventh aspects of the invention, the side wall portion of the seat cushion frame has reinforcing means for enhancing the strength of an upper portion of the side wall portion of the seat cushion frame relative to the strength of a lower portion thereof.

Accordingly, in addition to the arrangement provided for the seat for a vehicle according to any one of the first to seventh aspects of the invention, since the strength of the upper portion of the side wall portion of the seat cushion frame is reinforced by the reinforcing means so as to be greater relative to the strength of the lower portion thereof, during a rear collision of the vehicle, it is possible to allow the lower portion of the side wall portion of the seat cushion frame to be deformed stably while the deformation of the upper portion of the side wall portion of the seat cushion frame is suppressed. In addition, with respect to the load applied to the seat back frame from the rear by luggage or the like placed behind the seat during a front collision of the vehicle or the like, since the upper portion of the side portion of the seat cushion frame is reinforced, the structure is made resistant against the compressive force loaded onto the upper portion. Hence, it is possible to suppress the forward inclination of the seat cushion frame in the forward direction of the vehicle.

Namely, the seat in accordance with the eighth aspect of the invention is provided with such a structure that it is capable of absorbing the impact applied to the seat back frame in the rearward direction by allowing the seat cushion frame to be deformed, and does not allow the seat cushion frame to be deformed with respect to the impact applied to the seat back frame in the forward direction. As a result, the seat in accordance with the eighth aspect of the invention is capable of absorbing the impact during a rear collision of the vehicle, and of suppressing the deformation with respect to the load caused by luggage or the like during a front collision of the vehicle.

DESCRIPTION OF THE PREFERRED EMBODIMENT

Figure 1:
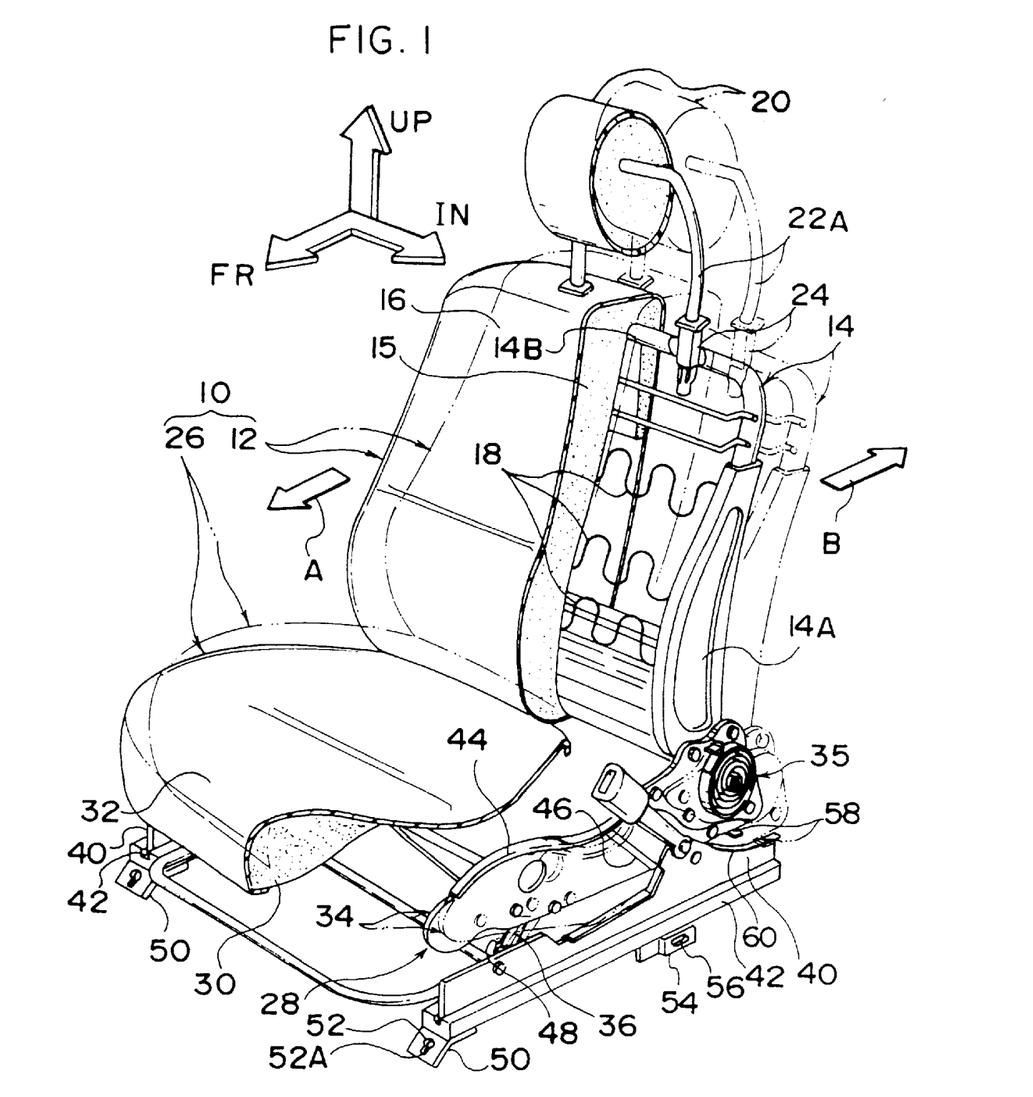
FIG. 1 is a perspective view, taken from the front inner side of the vehicle, of a seat for a vehicle in accordance with an embodiment of the present invention.
Figure 2:
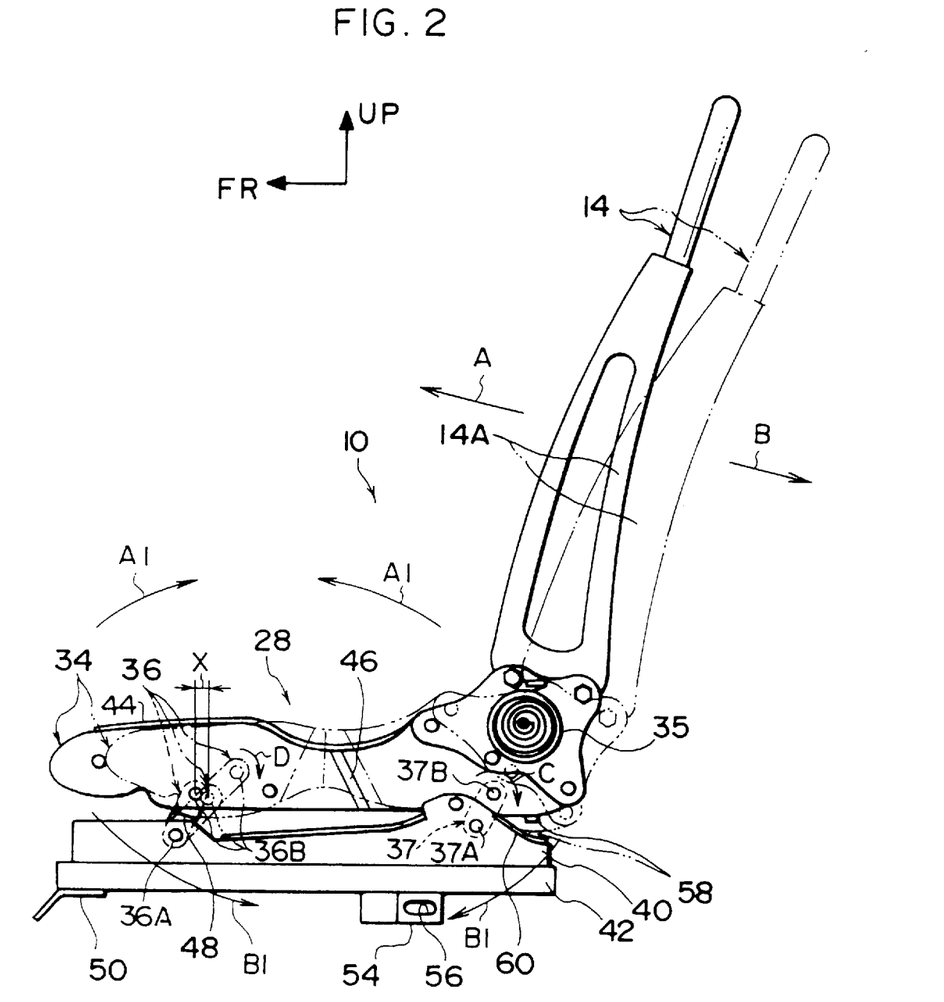
FIG. 2 is a schematic side view illustrating the skeleton of the seat for a vehicle in accordance with the embodiment of the present invention.
Figure 3:
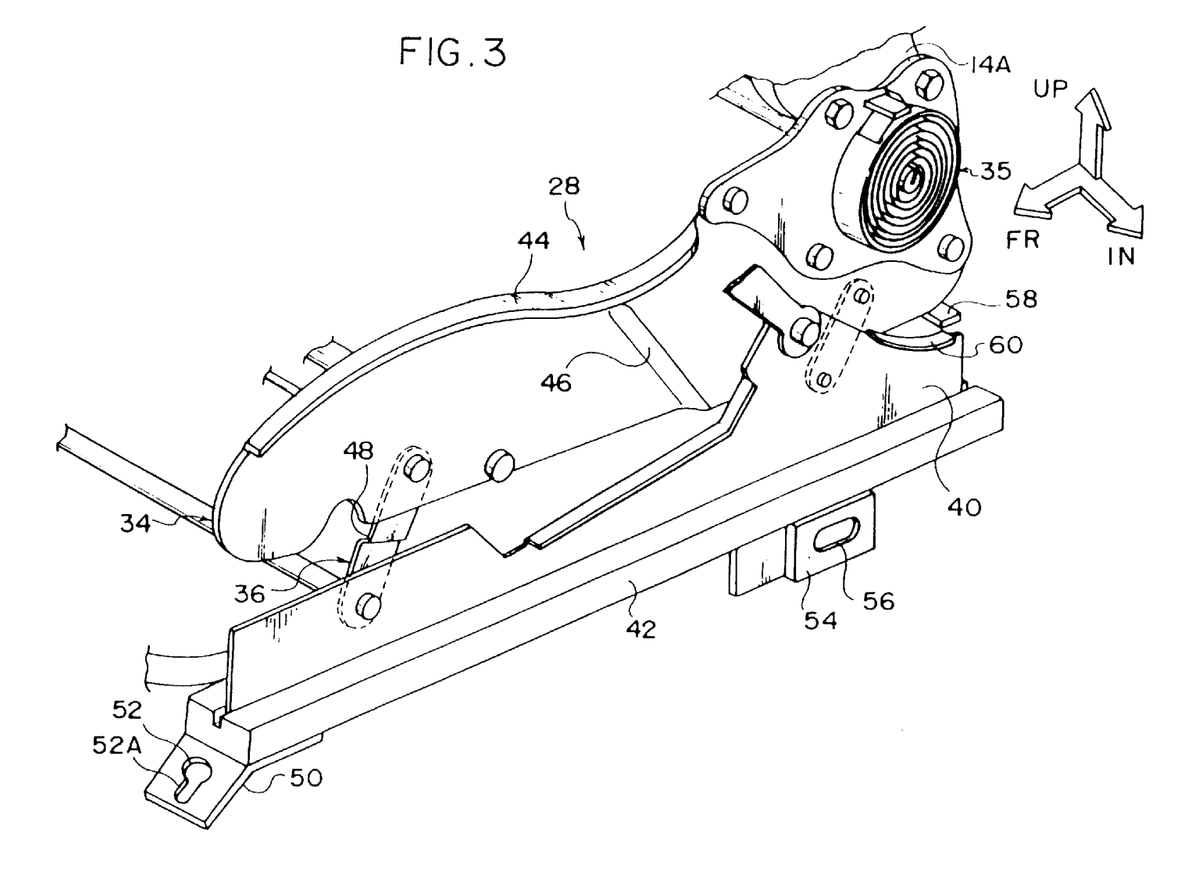
FIG. 3 is a perspective view, taken from the front inner side of the vehicle, of essential portions of the seat for a vehicle in accordance with the embodiment of the present invention.

Referring now to FIGS. 1 to 3, a description will be given of an embodiment of a seat for a vehicle in accordance with the present invention. It should be noted that, in the drawings, arrow FR indicates the forward direction of the vehicle, arrow UP indicates the upward direction of the vehicle, and arrow IN indicates the transversely inward direction of the vehicle.

As shown in FIG. 1, a seat 10 for a vehicle in the present embodiment is a driver's seat for an automobile, and a driver sits therein. A seat back 12 of the seat 10 has a structure in which a seat back frame 14, a cushion material 15, and a seat skin 16, which are known, are provided. A plurality of S springs 18 for supporting the back of the occupant seated in the seat 10 are provided in such a manner as to extend between a pair of left and right supporting brackets 14A of the seat back frame 14. Lower end portions 22A of a pair of headrest stays 22 projecting downward from a lower portion of a headrest 20 are attached to an upper portion 14B of the seat back frame 14 by means of a pair of supporting brackets 24. Incidentally, the supporting brackets 24 are welded to a front surface of the upper portion 14B of the seat back frame 14.

A seat cushion 26 of the seat 10 has a structure in which a seat cushion frame 28, a cushion material 30, and a seat skin 32 are provided. At rear end portions of lower arms 34 serving as left and right side wall portions of the seat cushion frame 28, the seat back 12 is pivotally supported via a reclining mechanism 35 in such a manner as to be tiltable back and forth.

It should be noted that, in the present embodiment, the lower arm 34 is attached to a seat track upper rail 40, which has a known structure, by means of front links 36 and rear links 37. If an unillustrated height adjusting dial is rotatively operated, the rear links 37 are adapted to swing back and forth about a connecting portion 37A for connection to the seat track upper rail 40 serving as a fulcrum, and the front links 36 thus driven are also adapted to swing back and forth about a connecting portion 36A for connection to the seat track upper rail 40 serving as a fulcrum. Thus, by rotatively operating the height adjusting dial, the vertical position of the seat cushion frame 28 can be adjusted.

The seat track upper rail 40 is set on a seat track lower rail 42 having a known structure in such a manner as to be slidable back and forth. A flange 44 serving as a reinforcing means is formed on the upper edge of the lower arm 34 in such a manner as to project outwardly of the seat, so that the compressive strength of the upper portion of the lower arm 34 is set to be higher than the compressive strength of the lower portion. In addition, this flange 44 is formed up to the vicinity of a front end of the lower arm 34 so as to suppress the compressive deformation of the upper portion of the lower arm 34 with respect to the load from the rear direction (the direction of arrow A in FIG. 1) which is applied to the seat back 12 from luggage or the like during a front collision of the vehicle.

In addition, a fragile portion 46 is formed in an intermediate portion, as viewed in the back-and-forth direction, of the lower arm 34. The arrangement provided is such that when the vehicle is hit by another vehicle from the rear of the vehicle, and an impact of a predetermined value or greater is applied to the seat back 12 in the direction going from the front of the vehicle towards the rear (in the direction of arrow B in FIG. 1) (during a rear collision of the vehicle), the force applied to the seat back frame 14 is applied to the lower portion of the lower arm 34 as a compressive force, so that the lower arm 34 undergoes compressive deformation beginning at the fragile portion 46. It should be noted that the fragile portion 46 is a bent portion having a step in the transverse direction of the vehicle, and is inclined at a predetermined angle such that the lower side thereof is closer to the rear of the vehicle than the upper side thereof with respect to the vertical direction of the lower arm 34.

Accordingly, when the load applied to the seat back 12 during the rear collision of the vehicle has reached a predetermined value or greater, the lower arm 34 starts to deform beginning at the fragile portion 46, and becomes deformed into such a shape that a lower portion of its central portion, as viewed in the back-and-forth direction, projects outwardly of the seat in the transverse direction of the vehicle, while its rear portion is deformed downward, as indicated by the two-dotted dash lines in FIGS. 1 and 2.

As shown in FIG. 3, an extendable portion 48 having a step in the transverse direction of the vehicle is formed in an intermediate portion of the front link 36. The arrangement provided is such that when the load applied to the seat back 12 during the rear collision of the vehicle has reached the predetermined value or greater, the front link 36 is extended in the direction in which the distance between its point of connection to the lower arm 34 and its point of connection to the seat track upper rail 40, which are formed at opposite end portions of the front link 36, is enlarged.

A front-side fixing bracket 50 is welded to a front end portion of the seat track lower rail 42, and a fixing hole 52, into which an unillustrated fixing member such as a bolt for fixing the seat track lower rail 42 to the vehicle body is inserted, is formed in the front fixing bracket 50. A slit 52A extending in the forward direction is formed in the fixing hole 52, and the arrangement provided is such that when the load of a predetermined value or greater has been applied to the seat track lower rail 42 in the rearward direction, the seat track lower rail 42 moves backward while causing the slit 52A to be expanded by the fixing member, thereby absorbing the impact. It should be noted that a rear fixing bracket 54 is welded to a rear end portion of the seat track lower rail 42, and a fixing elongated hole 56, into which an unillustrated fixing member such as a bolt for fixing the seat track lower rail 42 to the vehicle body is inserted and in which the back-and-forth direction is set as its longitudinal direction, is formed in the rear fixing bracket 54.

In addition, a projection 58 serving as one part of deformation-amount adjusting means is formed at a lower portion of a rear end of the lower arm 34 in such a manner as to extend in the outward direction of the seat. A flange 60 serving as another part of the deformation-amount adjusting means is formed at that portion of an upper portion of a rear end of the seat track upper rail 40 which corresponds to the aforementioned projection 58. The arrangement provided is such that when the amount of deformation of the lower arm 34 during the rear collision of the vehicle has reached a predetermined value, the projection 58 of the lower arm 34 abuts against the flange 60 so as to suppress the deformation of the rear portion of the lower arm 34 in the downward direction.

Next, a description will be given of the operation in accordance with the present embodiment.

With the seat for a vehicle in the present embodiment, when the vehicle is hit by another vehicle from the rear of the vehicle with an occupant seated in the seat 10, the occupant is caught by the seat back 12. The load (the load during the rear collision of the vehicle) acting in the rearward direction (in the direction of arrow B in FIG. 1) at this time is transmitted to the seat cushion frame 28 through the seat back frame 14.

As shown in FIG. 2, when the seat back frame 14 is loaded with an impact B during the rear collision, a bending moment acting in the direction of arrow B1 is applied to the lower arm 34. When the seat back frame 14 is loaded with an impact A during a front collision, a bending moment acting in the direction of arrow A1 is applied to the lower arm 34.

Accordingly, a specific description will be given of the impact absorbing function during a rear collision in accordance with the present embodiment. If it is preconditioned that the position of the rear link 37 is fixed with respect to the seat track upper rail 40 by the seat-height adjusting mechanism, the bending moment acting in the clockwise direction in FIG. 2 (in the direction of arrow C in FIG. 2) about a point of connection 37B of the rear link 37 to the lower arm 34 is applied to the lower arm 34 by the impact B loaded from the seat back frame 14. However, the lower arm 34 cannot rotate since its movement in the clockwise direction is restricted by the front link 36. Accordingly, when the bending moment in the direction of arrow C about the point of connection 37B of the rear link 37 to the lower arm 34 reaches a predetermined value or greater, the front link 36 rotates in the clockwise direction in FIG. 2 (in the direction of arrow D in FIG. 2) about its point of connection 36A to the seat track upper rail 40, so that this rotation causes a point of connection 36B of the front link 36 to the lower arm 34 to move by the distance X in the longitudinal direction of the vehicle, thereby applying a compressive force to the lower portion of the lower arm 34.

Consequently, the lower arm 34 undergoes compressive deformation into such a shape that the lower arm 34 projects outwardly of the seat in the transverse direction of the vehicle due to the compressive force applied to its lower portion, thereby absorbing the impact.

It should be noted that this compressive deformation takes place until a tension line is formed between the front-side ink 36 and the upper portion of the rear end of the lower arm 34 to which the seat back frame 14 is attached. When this tension line is formed, the compressive force is no longer applied to the lower portion of the lower arm 34, and this tension line suppresses any further rearward inclination of the seat back frame 14.

Next, a specific description will be given of the function of preventing the forward inclination of the seat back frame 14 during a front collision in accordance with the present embodiment. A bending moment in the counterclockwise direction (in the opposite direction to the direction of arrow C in FIG. 2) about the point of connection 37B of the rear link 37 to the lower arm 34 is applied to the lower arm 34 due to the impact A loaded from the seat back frame 14. However, since the upper portion of the lower arm 34 is provided with a structure which is highly resistant against the compressive force by means of the flange 44, the compressive deformation at the upper portion of the lower arm 34 is suppressed.

As a result, since the compressive deformation of the lower arm 34 is suppressed by the flange 44 at its upper portion, the lower arm 34 suppresses the forward inclination of the seat back frame 14.

Accordingly, when the load during the rear collision of the vehicle has reached a predetermined value or greater, the lower arm 34 of the seat cushion frame 28 starts to deform beginning at the fragile portion 46, and the lower portion of the central portion, in the back-and-forth direction, of the lower arm 34 undergoes deformation into such a shape as to project outwardly of the seat in the transverse direction of the vehicle, as indicated by the two-dotted dash lines in FIGS. 1 and 2, thereby absorbing the impact. For this reason, it is possible to absorb the impact without causing the seat back itself to become buckled and deformed. Further, the back of the occupant is supported while his or her seated attitude is maintained by the seat back.

In addition, in the present embodiment, when the load during the rear collision of the vehicle has reached a predetermined value or greater, the lower arm 34 starts to deform beginning at the fragile portion 46, so that the deformation is stabilized as compared with a case where the fragile portion 46 is not formed. Furthermore, since the fragile portion 46 has a step in the transverse direction of the vehicle, and is inclined at a predetermined angle such that the lower side thereof is closer to the rear of the vehicle than the upper side thereof with respect to the vertical direction of the lower arm 34, it is possible to increase the amount of absorption of the impact.

In addition, in the present embodiment, when the load applied to the seat back 12 during the rear collision of the vehicle has reached a predetermined value or greater, the front link 36 is extended at the extendable portion 48 in the direction in which the distance between the point of connection 36B to the lower arm 34 and the point of connection 36A to the seat track upper rail 40 is enlarged. Hence, the extension of the front link 36 makes it possible to increase the amount of compressive deformation of the lower portion of the lower arm 34, and increase the amount of absorption of the impact. However, if the extension of the front link 36 is made excessively large, the rearward inclination of the seat back becomes excessively large, so that the extension should be allowed to take place in correspondence with the amount of rearward inclination of the seat back.

In addition, in the present embodiment, when the amount of deformation of the lower arm 34 has reached a predetermined value, the projection 58 of the lower arm 34 abuts against the flange 60 to suppress the deformation of the rear portion of the lower arm 34 in the downward direction, so that it is possible to reliably reduce the rearward inclination of the seat back 12.

Further, in the present embodiment, when a load of a predetermined value or greater is applied from the lower arm 34 to the seat track lower rail 42 in the rearward direction, the seat track lower rail 42 moves backward while causing the slit 52A to be expanded by the fixing member such as a bolt for fixing the seat track lower rail 42 to the vehicle body. Hence, the impact during the rear collision of the vehicle can be absorbed by this arrangement as well.

Furthermore, in the present embodiment, since the strength of the upper portion of the lower arm 34 is set to be greater than that of the lower portion by the flange 44 serving as the reinforcing means, during a rear collision of the vehicle the deformation of the lower arm 34 is stabilized, and during a front collision of the vehicle it is possible to effectively suppress the deformation of the lower arm 34 with respect to the load applied to the seat back 12 from the rear from luggage or the like, and the luggage holding performance also improves. It should be noted that luggage is frequently placed in the central portion in the transverse direction of the vehicle, and the load due to luggage during a front collision of the vehicle tends to be greater for the lower arm 34 on the transversely inner side of the vehicle than for the lower arm 34 on the transversely outer side of the vehicle. For this reason, by making the width of the flange 44 of the lower arm 34 on the transversely inner side of the vehicle larger than the width of the flange 44 of the lower arm 34 on the transversely outer side of the vehicle, and by thus setting the strength of the lower arm 34 on the transversely inner side of the vehicle to be greater than the strength of the lower arm 34 on the transversely outer side of the vehicle, it is possible to set the strength for the load for each of the lower arms 34 on the inner and outer sides, and wasteful reinforcement is not needed. Hence, it is possible to suppress an increase in weight due to the reinforcement, thereby making it possible to reduce the overall weight of the vehicle.

Although a detailed description has been given above of a specific embodiment of the present invention, the present invention is not limited to such an embodiment, and it is apparent to those skilled in the art that various modifications are possible within the scope of the present invention. For example, although in the present embodiment a description has been given of the arrangement which is provided with the mechanism for adjusting the vertical height of the seat 10 by means of the front link 36 and the rear link 37, even in a case where the vertical-height adjusting mechanism is not provided, the impact during the rear collision can be absorbed by the compressive deformation of the lower arm 34. Namely, if an arrangement is adopted in which, instead of using the rear link 37, the seat track upper rail 40 and the lower arm 34 are directly connected by an attaching means such as a bolt, a similar compressive deformation is allowed to take place in the lower arm 34.

Further, as for the aforementioned mechanism for connecting the lower arm 34 and the seat track upper rail 40, if an arrangement is provided such that the front of the lower arm 34 is directly connected to the seat track upper rail 40 by an attaching means such as a bolt, and the rear of the lower arm 34 is connected to the seat track upper rail 40 by means of the rear link 37, the impact can be absorbed in a similar manner. Still alternatively, an arrangement may be adopted such that the lower arm 34 and the seat track upper rail 40 are directly connected at two front and rear locations by attaching means such as bolts, one of the front and rear connecting holes in the lower arm 34 is formed as an elongated hole, and the lower portion of the lower arm 34 approaches the other connecting bolt side in the direction of compressive deformation. In short, various modifications are possible insofar as the arrangement allows the lower portion of the lower arm 34 to undergo compressive deformation with respect to the seat track upper rail 40.

Figure 4:
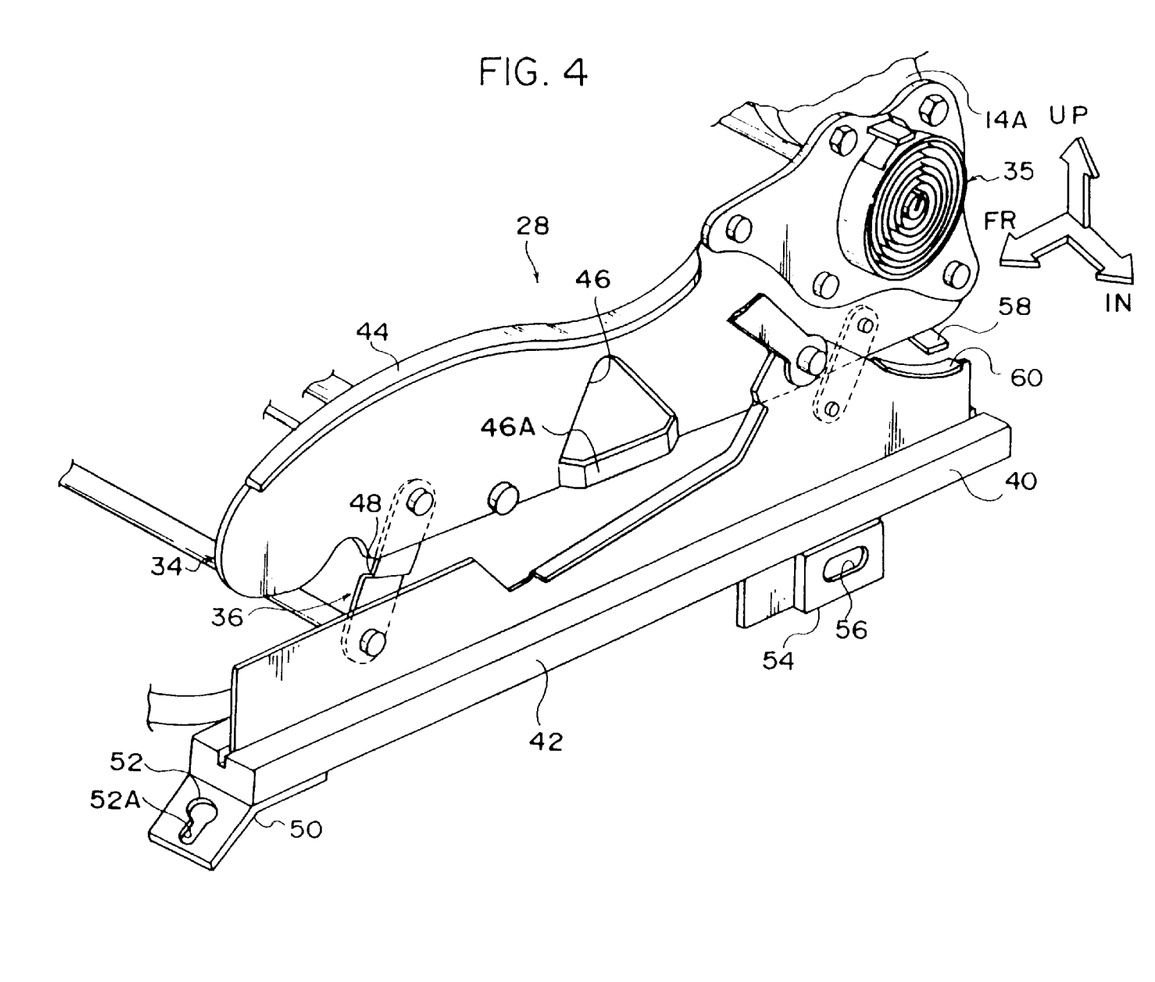
FIG. 4 is a perspective view, taken from the front inner side of the vehicle, of essential portions of the seat for a vehicle in accordance with a modification of the embodiment of the present invention.

Furthermore, although in the present embodiment the fragile portion 46 of the lower arm 34 is formed as the bent portion having a step in the transverse direction of the vehicle, the fragile portion 46 is not limited to the bent portion, and the fragile portion 46 may be formed as a substantially triangular notch in which a lower outer peripheral portion 46A projects outwardly of the seat, as shown in FIG. 4.

Figure 5:
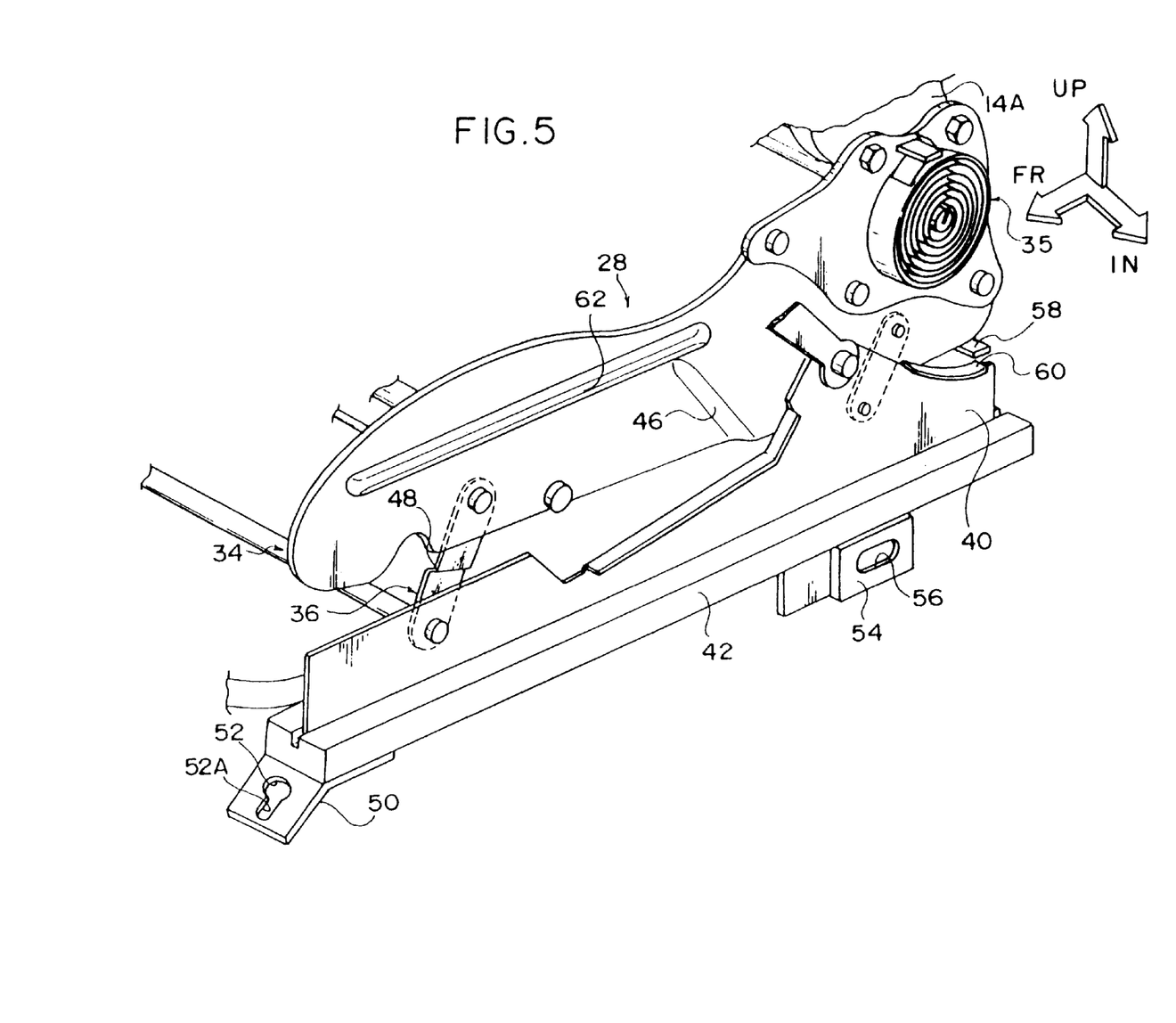
FIG. 5 is a perspective view, taken from the front inner side of the vehicle, of essential portions of the seat for a vehicle in accordance with another modification of the embodiment of the present invention.

In addition, although in the present embodiment the flange 44 serving as the reinforcing means is formed at the upper edge of the lower arm 34 in such a manner as to project outwardly of the seat so as to set the strength of the upper portion of the lower arm 34 to be greater than the strength of the lower portion thereof, instead of the flange 44 another reinforcing means such as a bead 62 extending in the lengthwise direction may be formed on an upper portion of the lower arm 34, as shown in FIG. 5. Incidentally, the bead 62 may be formed on only the lower arm 34 on the transversely inner side of the vehicle between the left and right lower arms 34 on which the flanges 44 of the same width are respectively formed, so as to set the strength of the lower arm 34 on the transversely inner side of the vehicle to be greater than the strength of the lower arm 34 on the transversely outer side of the vehicle.

Figure 6:
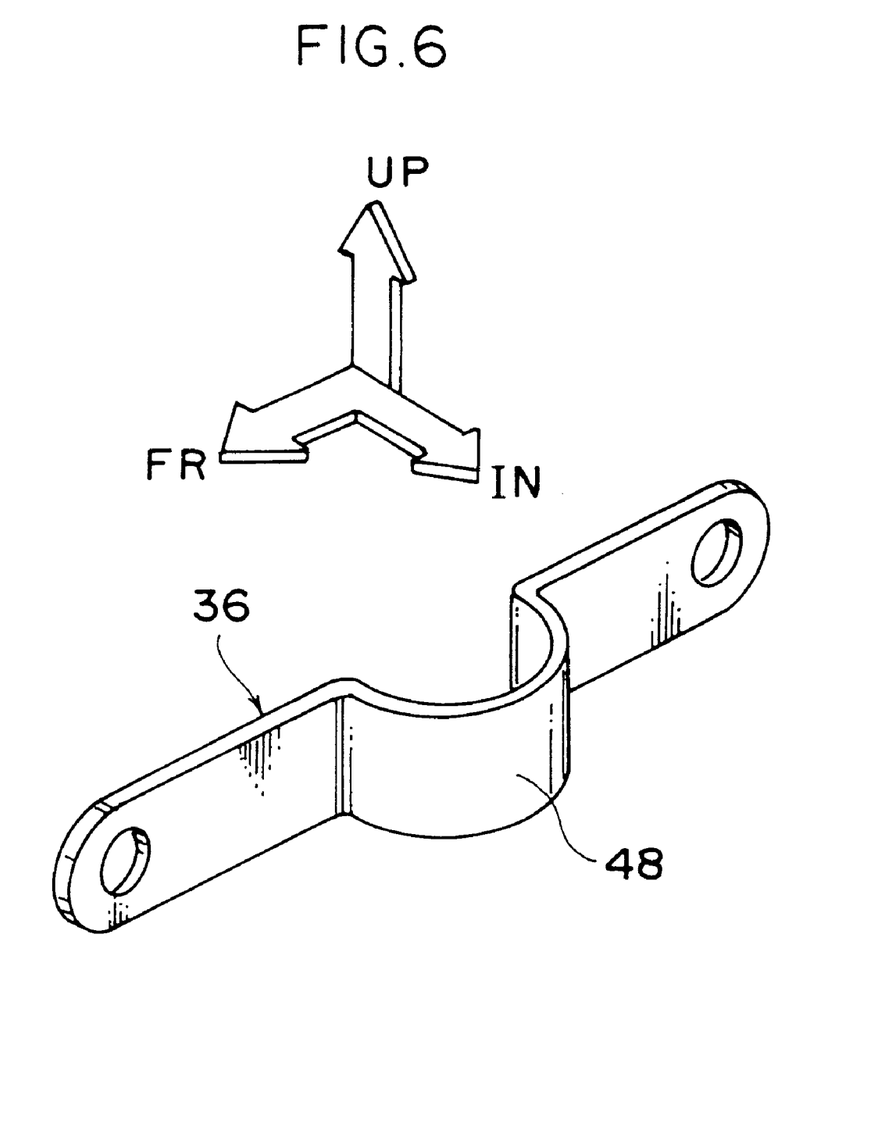
FIG. 6 is a perspective view, taken from the front inner side of the vehicle, of a modification of a front link of the seat for a vehicle in accordance with the embodiment of the present invention.

In addition, although in the present embodiment the extendable portion 48 having the step in the transverse direction of the vehicle is formed in the intermediate portion of the front link 36, the shape of the extendable portion 48 is not limited to the same. For example, as shown in FIG. 6, an intermediate portion of the front link 36 may be formed as the extendable portion 48 in such a manner as to project curvedly in a semicircular shape in the widthwise direction of the seat.

Figure 7:
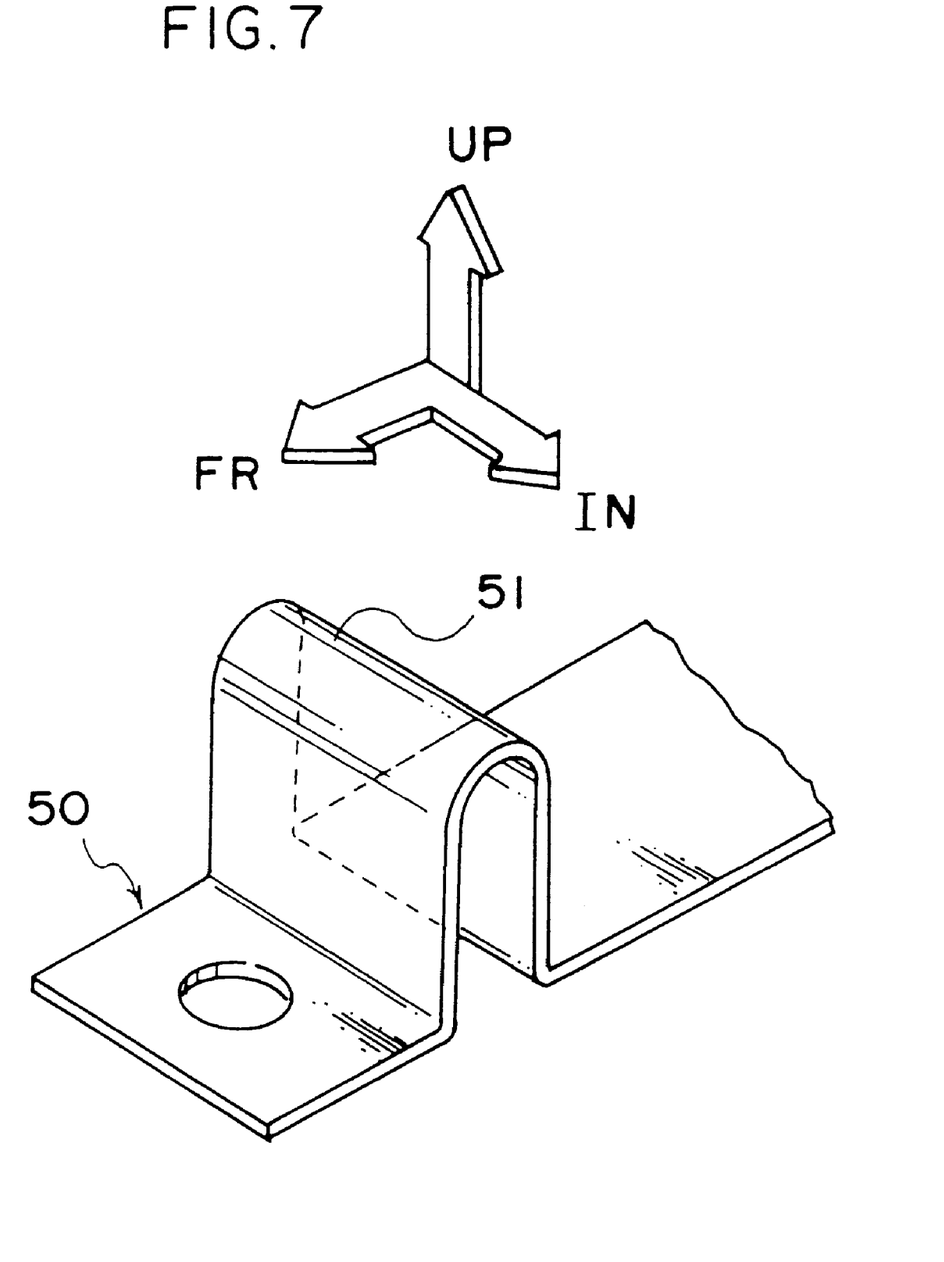
FIG. 7 is a perspective view, taken from the front inner side of the vehicle, of a modification of a front-side fixing bracket of the seat for a vehicle in accordance with the embodiment of the present invention.

In addition, in the present embodiment, the slit 52A is formed in the fixing hole 52 in the front fixing bracket 50 in such a manner as to extend in the forward direction, and the arrangement provided is such that when the load of a predetermined value or greater has been applied to the seat track lower rail 42 in the rearward direction, the seat track lower rail 42 moves backward while causing the slit 52A to be expanded by the fixing member, thereby absorbing the impact. However, instead of this arrangement, as shown in FIG. 7, an extendable portion 51 which is curved in a U-shape in the upward direction may be formed in the front fixing bracket 50, such that when the load of a predetermined value or greater has been applied to the seat track lower rail 42 in the rearward direction, the extendable portion 51 is extended in the lengthwise direction, thereby absorbing the impact.

Figure 8:
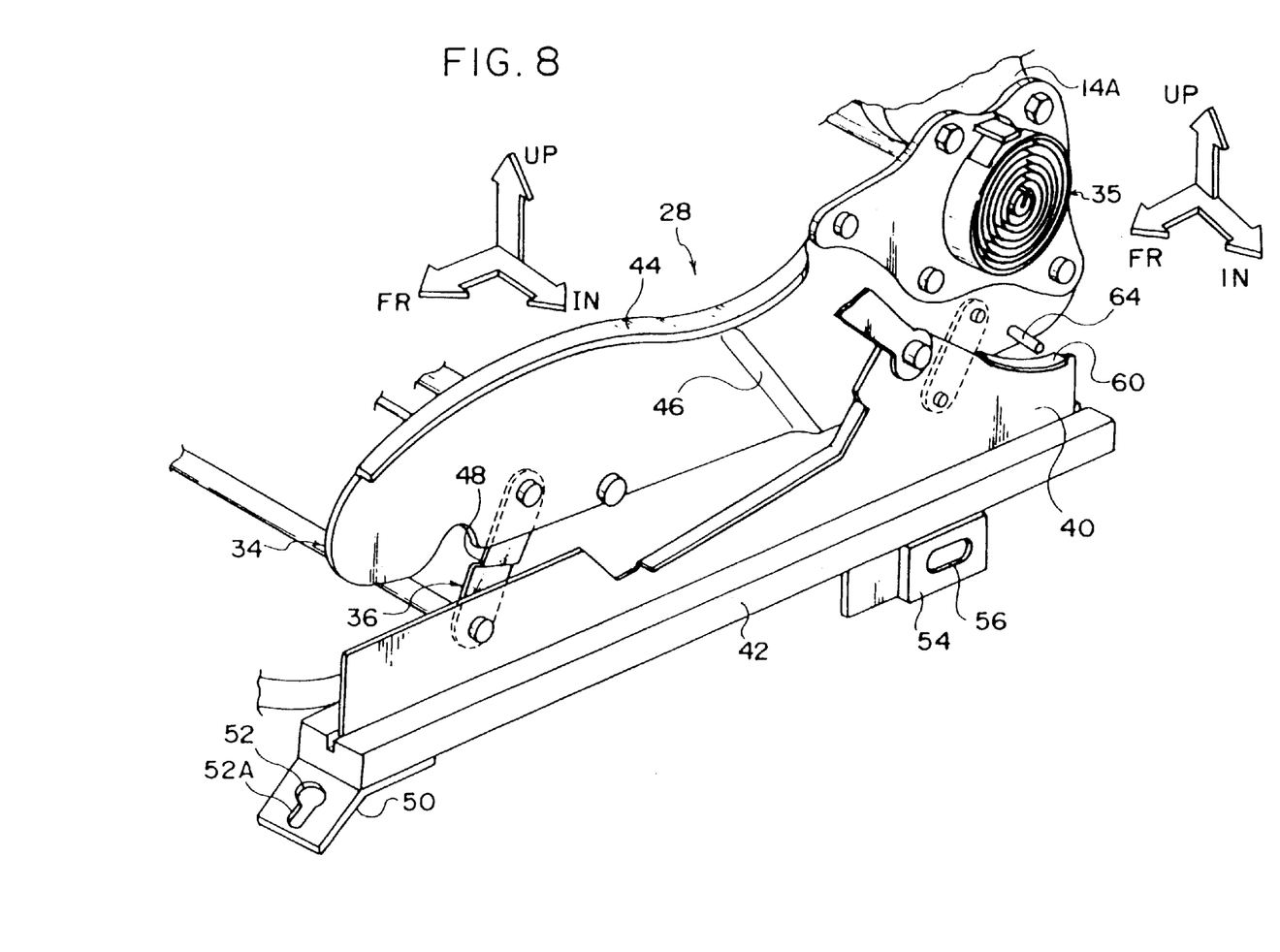
FIG. 8 is a perspective view, taken from the front inner side of the vehicle, of a modification of a deformation-amount adjusting means of the seat for a vehicle in accordance with the embodiment of the present invention.
Figure 9:
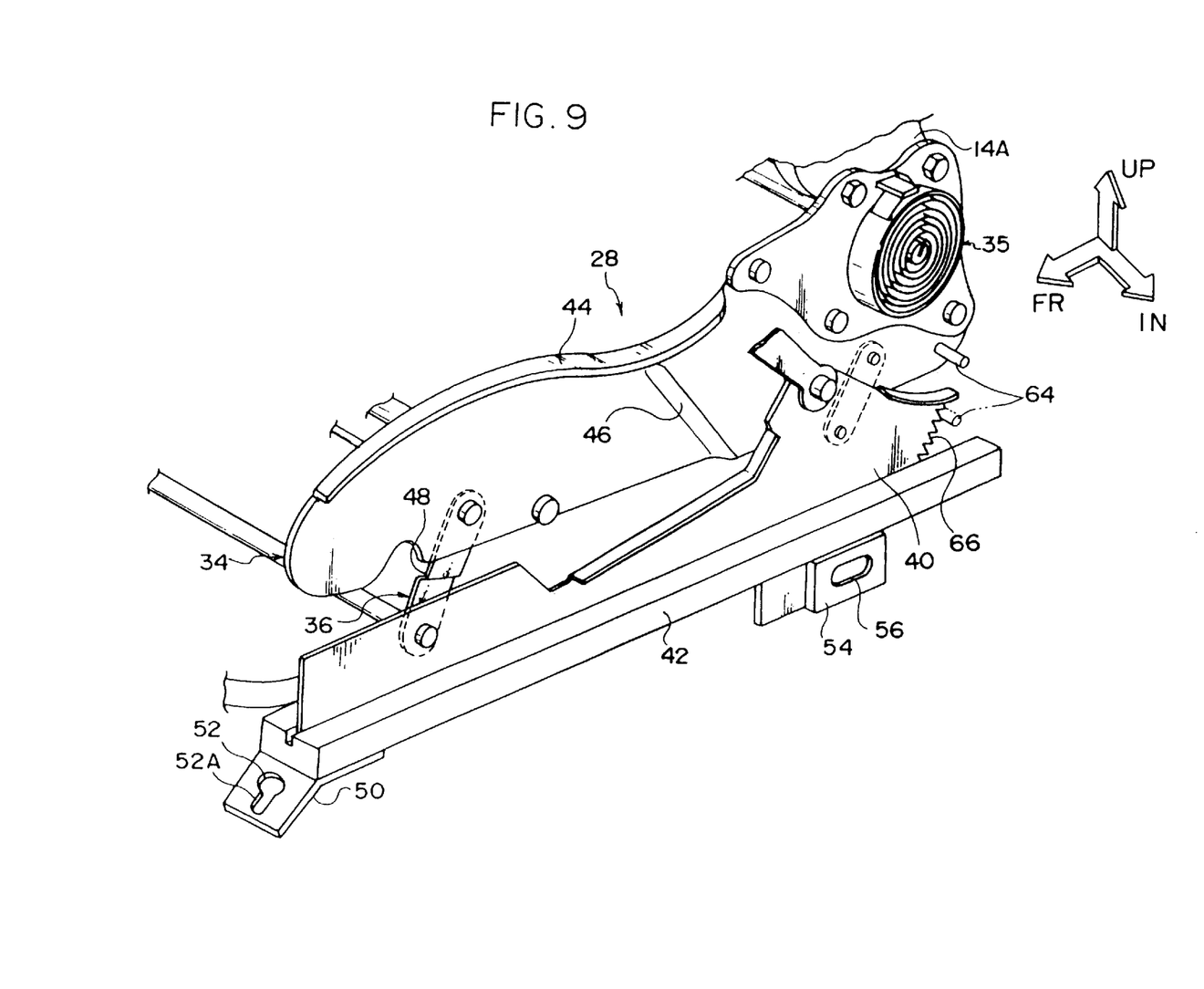
FIG. 9 is a perspective view, taken from the front inner side of the vehicle, of a modification of a deformed-state maintaining means of the seat for a vehicle in accordance with the embodiment of the present invention.

In addition, in the present embodiment, the arrangement provided is such that the projection 58 formed on the lower arm 34 as one part of the deformation-amount adjusting means is adapted to abut against the flange 60 formed on the seat track upper rail 40 as another part of the deformation-amount adjusting means, so as to suppress the deformation of the rear portion of the lower arm 34 in the downward direction. However, instead of this arrangement, as shown in FIG. 8, a pin 64 formed on the lower arm 34 as one part of the deformation-amount adjusting means may be adapted to abut against the flange 60 formed on the seat track upper rail 40 as another part of the deformation-amount adjusting means, so as to suppress the deformation of the lower arm 34. Still further, as shown in FIG. 9, a serrated engaging portion 66 serving as one part of deformed-state maintaining means may be formed at the rear end of the seat track upper rail 40, such that when the amount of deformation of the lower arm 34 has reaches a predetermined value during the rear collision of the vehicle, the pin 64 serving as another part of the deformed-state maintaining means engages the engaging portion 66 so as to maintain the deformed state and suppress the return of the deformation, thereby making it possible to hold the occupant more effectively.

Figure 10:
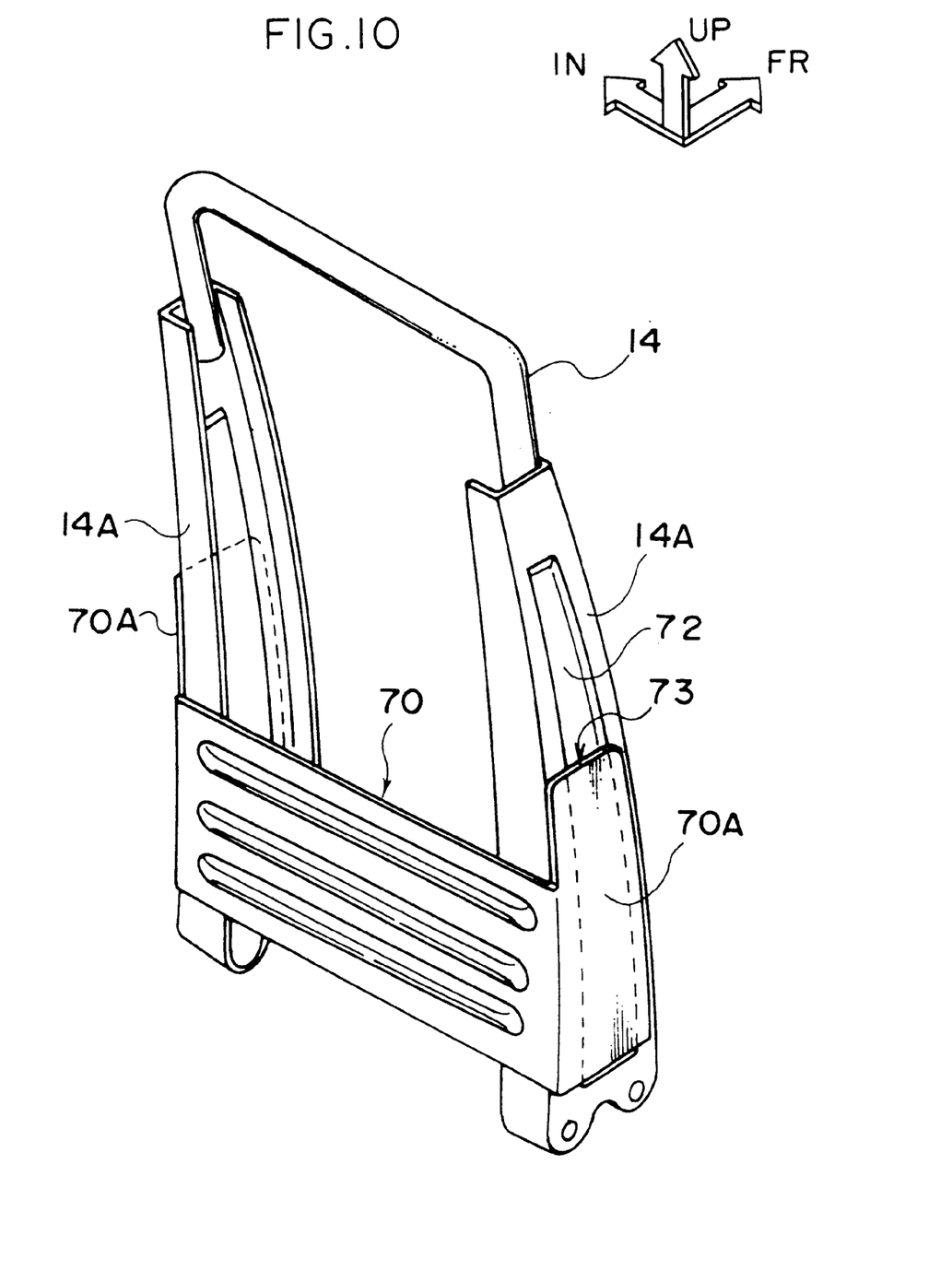
FIG. 10 is a perspective view, taken from the rear outer side of the vehicle, of a seat back frame of the seat for a vehicle in accordance with the embodiment of the present invention.

In addition, with the seat 10 in accordance with the present embodiment, a pair of bent portions 70A which are bent forward are formed at opposite ends, as viewed in the widthwise direction of the seat, of a lower brace 70 for connecting the left and right supporting brackets 14A of the seat back frame 14, as shown in FIG. 10. These bent portions 70A extended upward, and are joined to outer side surfaces of the supporting brackets 14A. As a result, it is possible to improve the rigidity of the supporting brackets 14A without increasing the number of component parts such as reinforcing members. Additionally, a recessed portion 72 is formed in each supporting bracket 14A, and a closed sectional structure 73 is formed by the recessed portion 72 and the bent portion 70A, so that the rigidity of the supporting bracket 14A can be improved further.

Figure 11:
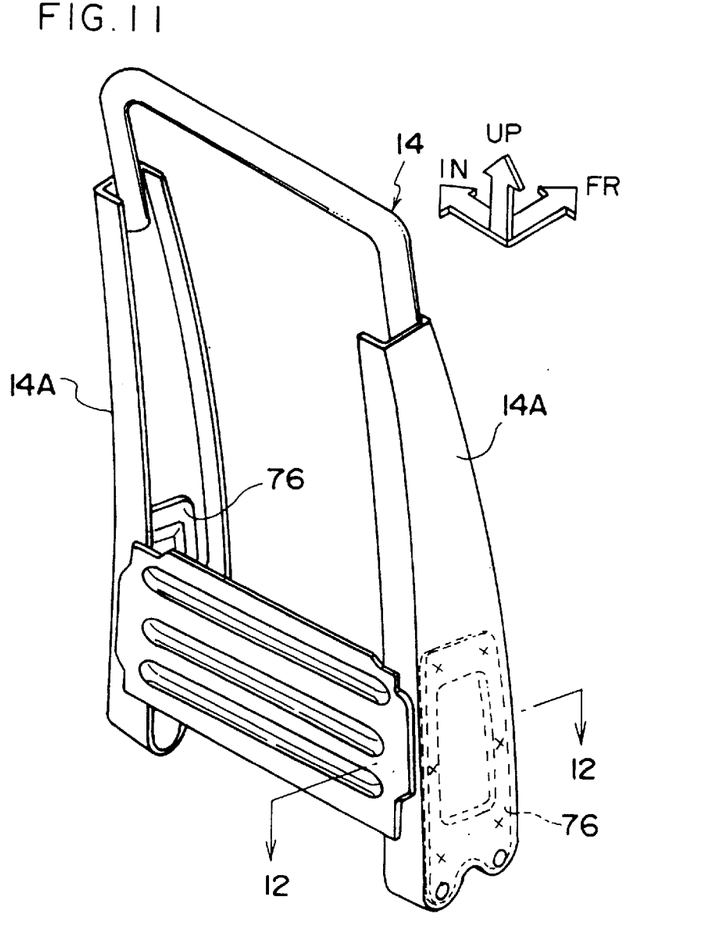
FIG. 11 is a perspective view, taken from the rear outer side of the vehicle, of the seat back frame of the seat for a vehicle in accordance with a modification of the embodiment of the present invention.
Figure 12:
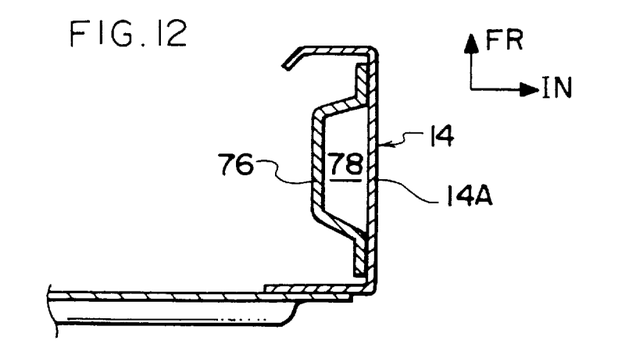
FIG. 12 is a cross-sectional view taken along line 12—12 of FIG. 11.

Moreover, instead of the bent portions 70A of the lower brace 70, as shown in FIG. 11, an arrangement may be provided such that a nut-attaching portion reinforcement 76 provided at a lower portion of each supporting bracket 14A is extended upward, and is joined to an inner side surface of the supporting bracket 14A, so as to improve the rigidity of the supporting bracket 14A. Further, as shown in FIG. 12, if the nut-attaching portion reinforcement 76 is formed into a hat shape in its cross-sectional shape, and a closed sectional structure 78 is formed by the nut-attaching portion reinforcement 76 and the supporting bracket 14A, the rigidity of the supporting bracket 14A can be improved further.

Although in the present embodiment the seat for a vehicle in accordance with the present invention is applied to a driver's seat for an automobile, the seat for a vehicle in accordance with the present invention is also applicable to a front passenger's seat, a rear seat, and the like, and to a seat for a vehicle other than an automobile.

What is claimed is:

1. A seat for a vehicle comprising:
   a side wall portion of a seat cushion frame for supporting a seat back, said side wall portion being deformed when a load applied to said seat back during a rear collision of the vehicle reaches a predetermined value or greater, so as to absorb an impact applied to a seated vehicle occupant; and
   a fragile portion where deformation begins is formed at said side wall portion of said seat cushion frame,
   wherein said side wall portion of said seat cushion frame is supported by a vehicle body by front and rear fixing portions, and undergoes deformation between the front and rear fixing portions.

2. The seat for a vehicle according to claim 1, wherein said fragile portion is a bent portion having a step in a transverse direction of the vehicle.

3. The seat for a vehicle according to claim 2, wherein said bent portion is inclined at a predetermined angle with respect to a vertical direction of said side wall portion of said seat cushion frame such that a lower portion of said bent portion is closer to a rear of the vehicle than an upper portion of said bent portion.

4. The seat for a vehicle according to claim 1, wherein said fragile portion is a notch.

5. The seat for a vehicle according to claim 4, wherein said fragile portion is a substantially triangular notch at whose bottom portion there is provided a projecting member which projects outwardly of the seat.

6. The seat for a vehicle according to claim 1, further comprising:
   a front link and a rear link which are respectively disposed at said fixing portions to connect the vehicle body and said side wall portion of said seat cushion frame;
   wherein said front link has an extendable portion that extends in a direction in which a distance between link connecting points formed at opposite ends of said front link is increased when the load applied to said seat back during the rear collision of the vehicle reaches a predetermined value or greater.

7. The seat for a vehicle according to claim 6, wherein said extendable portion is a bent portion having a step in a transverse direction of the vehicle at a substantially intermediate portion of said front link.

8. The seat for a vehicle according to claim 6, wherein said extendable portion is formed in such a manner as to project curvedly at a substantially intermediate portion of said front link.

9. The seat for a vehicle according to claim 1, further comprising:
   deformation-amount adjusting means for preventing said side wall portion of said seat cushion frame from deforming by a predetermined amount or more.

10. The seat for a vehicle according to claim 9, wherein said deformation-amount adjusting means comprises a projection formed at the rear end of said side wall portion of said seat cushion frame, and a flange which is formed at a vehicle body so as to face said projection.

11. The seat for a vehicle according to claim 9, further comprising:
    deformed-state maintaining means for maintaining said side wall portion of said seat cushion frame in a deformed state when an amount of deformation of said side wall portion reaches a predetermined value.

12. The seat for a vehicle according to claim 11, wherein said deformation-amount adjusting means is a pin-shaped projection formed at a rear end of said side wall portion of said seat cushion frame, and said deformed-state maintaining means is an engagement portion formed at the vehicle body, and when an amount of deformation of said side wall portion of said seat cushion frame reaches a predetermined value, said pin-shaped projection engages said engagement portion.

13. The seat for a vehicle according to claim 12, wherein said engagement portion is a serrated portion.

14. The seat for a vehicle according to claim 1, wherein said side wall portion of said seat cushion frame is mounted to a vehicle body via a body mounted portion, a fixing bracket fixing said body mounted portion to the vehicle body is mounted to a front end portion of said body mounted portion, and when a load of a predetermined value or greater is applied to said body mounted portion in a direction toward a rear of the vehicle, said fixing bracket deforms so as to absorb an impact by the load.

15. The seat for a vehicle according to claim 14, wherein a fixing hole is formed in said fixing bracket, the fixing hole being formed by a substantially circular portion and a slit-shaped portion communicating with the substantially circular portion.

16. The seat for a vehicle according to claim 14, wherein an extendable portion which is a curved shape is formed at said fixing bracket.

17. The seat for a vehicle according to claim 1, wherein said side wall portion of said seat cushion frame has reinforcing means for enhancing the strength of an upper portion of said side wall portion of said seat cushion frame relative to the strength of a lower portion thereof.

18. The seat for a vehicle according to claim 17, wherein the strength of the reinforcing means at the vehicle transverse direction inner-side side wall portion of said seat frame is greater than the strength of the reinforcing means at the vehicle transverse direction outer-side side wall portion of said seat frame.

19. The seat for a vehicle according to claim 17, wherein a flange is formed on the upper edge of said side wall portion of said seat cushion.

20. The seat for a vehicle according to claim 17, wherein a bead extending in a vehicle longitudinal direction is formed on an upper portion of said side wall portion of said seat cushion.

21. The seat for a vehicle according to claim 1, wherein said side wall portion is deformable such that a lower portion of said side wall portion is compressed in a longitudinal direction of the vehicle when the load applied to said seat back during the rear collision of the vehicle has reached the predetermined value or greater.

22. The seat for a vehicle according to claim 1, wherein said side wall portion is deformable such that a lower portion of said side wall portion is deformed so as to project outwardly of the seat in a transverse direction of the vehicle when the load applied to said seat back during the rear collision of the vehicle has reached the predetermined value or greater.

23. A seat for a vehicle comprising:

a side wall portion of a scat cushion frame for supporting a scat back, said side wall portion being deformed when a load applied to said seat back during a rear collision of the vehicle reaches a predetermined value or greater, so as to absorb an impact applied to a seated vehicle occupant;

a fragile portion where deformation begins is formed at said side wall portion of said seat cushion frame;

front links and rear links for connecting a vehicle body and said side wall portion of said seat cushion frame, wherein said fragile portion is formed at a substantially central portion of said side wall portion in a longitudinal direction thereof.

* * * * *